United States Patent Office 3,328,404
Patented June 27, 1967

3,328,404
DERIVATIVES OF PYRAZINE
Peter I. Pollak, Scotch Plains, and Roger J. Tull, Metuchen, N.J., assignors to Merck & Co., Inc., Rahway, N.J., a corporation of New Jersey
No Drawing. Filed Aug. 25, 1966, Ser. No. 574,904
12 Claims. (Cl. 260—250)

This invention is concerned with a novel process for the preparation of (3,5-diamino-6-halopyrazinoyl)guanidine and (3,5-diamino-6-halopyrazinamido)guanidine compounds which possess useful diuretic properties but more importantly they selectively enhance the excretion of sodium and chloride ions while suppressing the excretion of potassium. The products prepared by the novel process of this invention are especially useful in the treatment or management of edema and other abnormalities resulting from the retention of excess quantities of sodium and/or fluid by the animal organism.

The novel process of this invention involves the reaction of an N-disubstituted 3,5-diamino-6-halopyrazinamidine I with a guanidine or an aminoguanidine II and treatment of the N'-amidino or guanidino N-disubstituted 3,5-diamino-6-halopyrazinamidine IV thus formed with a mineral acid to give the desired (3,5-diamino-6-halopyrazinoyl)guanidine or -amino- guanidine product IV. The initial step of the reaction can be carried out at a temperature between about 5° C. to about 60° C. or at reflux temperature of the reaction mixture if below 60° C. Any mineral acid with the exception of nitric acid can be employed in the second step of the reaction at a concentration of between about 1–12 N. A solvent preferably is employed and can be any solvent that will dissolve the reactants, such as dioxane, ether, isopropyl ether and the like.

While the novel method of this invention can be employed to produce substantially any (3,5-diamino-6-halopyrazinoyl)guanidine or (3,5-diamino-6-halopyrazinamido)guanidine product, the reaction is particularly useful in the preparation of products having the following structural formula:

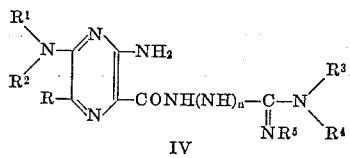

and acid addition salts thereof wherein R is halogen, particularly chloro or bromo; $R^1$ and $R^2$ can be the same or dissimilar groups selected from hydrogen, lower alkyl advantageously having from 1 to 5 carbon atoms as methyl, ethyl, propyl, isopropyl, butyl, amyl, or any of the branched 4 or 5 carbon alkyl groups, lower alkenyl, advantageously having from 3 to 5 carbon atoms and particularly the allyl, propargyl or 3-pentenyl and the like, or a lower(cycloalkyl-alkyl) group advantageously having from 4 to 8 carbons in the group such as the cyclopropylmethyl, cyclopentylmethyl, cyclohexylmethyl, cyclohexylethyl, cyclopropylethyl and the like; $R^3$ represents hydrogen, a lower alkyl advantageously having from 1 to 5 carbon atoms, such as methyl, ethyl, propyl, isopropyl, butyl, amyl, or any of the branched 4 or 5 carbon lower alkyl groups, or substituted lower alkyl groups having from 1 to 5 carbon atoms and particularly those containing hydroxy or a heterocyclic substituent such as the pyridyl substituent or a phenyl substituent, the phenyl lower alkyl advantageously having an alkyl moiety of 1 to 2 carbon atoms and the phenyl moiety being either unsubstituted or substituted with 1 or more halogen (preferably chlorine, bromine, fluorine), lower alkyl (having 1 to 2 carbon atoms) and lower alkoxy (having 1 to 2 carbon atoms) groups; $R^4$ advantageously is hydrogen, lower alkyl having 1 to 5 carbon atoms such as methyl, ethyl, propyl, isopropyl, butyl, amyl or any of the branched 4 or 5 carbon alkyl groups, phenyl-lower alkyl wherein the alkyl moiety advantageously has from 1 to 2 carbon atoms and the phenyl moiety being either unsubstituted or having one or more substituents selected preferably from halogen (advantageously chlorine, bromine, fluorine), lower alkyl (advantageously having from 1 to 2 carbon atoms) and lower alkoxy (having 1 to 2 carbon atoms) groups; when $R^3$ and $R^4$ are each lower alkyl they can be linked together to form a cyclic structure with the nitrogen atom to which they are attached, thereby forming a group having the structure

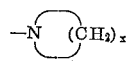

wherein $x$ preferably is one of the numerals from 4 through 7 thus yielding, for example, the 1-pyrrolidinyl group; $R^5$ advantageously is hydrogen or lower alkyl having from 1 to 5 carbon atoms such as methyl, ethyl, propyl, isopropyl, butyl, amyl or any of the branched 4 or 5 carbon alkyl groups; and when $R^5$ and $R^4$ each are lower alkyl, they can be linked together to form the structure

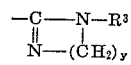

wherein $y$ preferably is one of the numerals 2 or 3; and $n$ is either 0 or 1.

The novel process of this invention can be illustrated by the following reaction scheme wherein the variable radicals have the meaning assigned to each of them above:

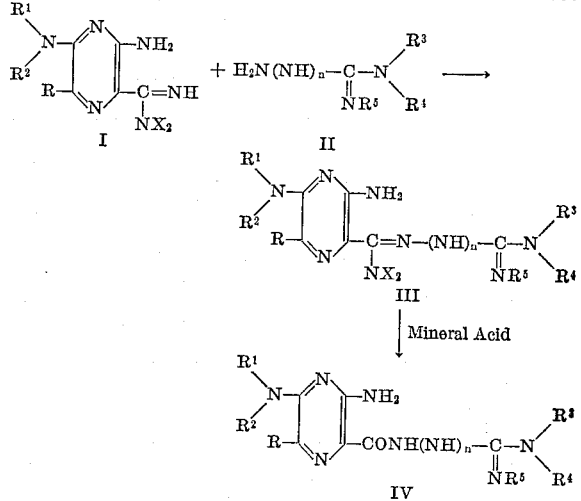

The guanidine or aminoguanidine reactants (II) are readily available compounds or can be prepared by methods described in the literature. The free base is preferred in the reaction and advantageously can be prepared in situ from a salt of the guanidine or aminoguanidine by known methods.

The N-disubstituted 3,5-diamino-6-halopyrazinamidine reactant (I) wherein $R^1$ and $R^2$ have the meaning assigned above and X is lower alkyl preferably having from 1 to 4 carbon atoms such as methyl, ethyl, propyl, isopropyl, butyl and the like or an aralkyl such as benzyl, phenethyl and the like, are themselves new compounds which constitute another feature of this invention. These reactants I are prepared by a series of reactions from known alkyl 3,5-diamino-6-halopyrazinoates (V). The preparation of the needed intermediate I is illustrated by the following reaction schemes (a) through (c):

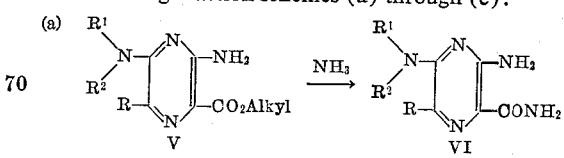

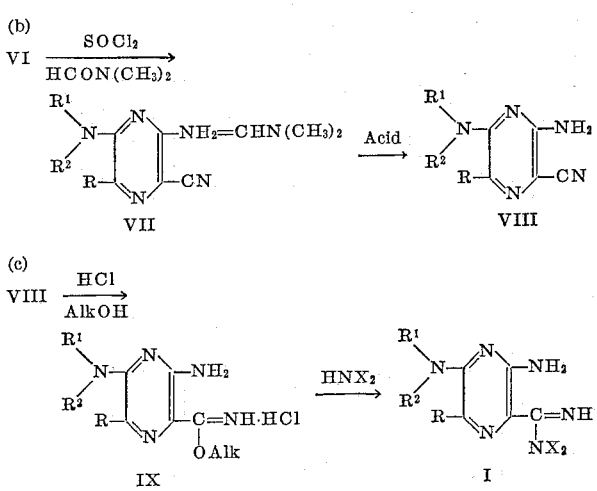

(a) The 3,5-diamino-6-halopyrazinamide (VI) intermediates advantageously are prepared by the reaction of the appropriate alkyl 3,5-diamino-6-halopyrazinoate (V) with ammonia. Reaction can be conducted using liquid ammonia at temperatures slightly below or slightly above ambient temperature, or the ester V can be dissolved in an inert solvent and ammonia gas admitted below the surface of the solution.

(b) The 3,5-diamino-6-halopyrazinamides (VI) upon treatment with either phosphoryl chloride or thionyl chloride in the presence of dimethylformamide advantageously with warming, form the corresponding N,N-dimethyl - N' - (3 - cyano - 5 - halo - 6 - amino - 2 - pyrazinyl) formamidines (VII) which can be hydrolyzed in the presence of a strong mineral or organic acid (such as hydrochloric, sulfuric, methanesulfonic and the like acid) to produce the 3,5-diamino-6-halopyrazinonitriles (VIII).

It is to be recognized that if $R^1$ and $R^2$ in the starting amide VI are each hydrogen, in the intermediate (VII) the 5-position amino group will be $-N=CHN(CH_3)_2$, but in the product (VIII) the 5-position group will be reconstituted to the free amino group since hydrolysis will involve both the 3- and the 5-substituents.

(c) The pyrazinonitriles (VIII) upon reaction with a lower alkanol advantageously one having from 1 to 3 carbon atoms under anhydrous conditions and in the presence of hydrogen chloride or hydrogen bromide gas, is converted to the alkyl 3,5-diamino-6-halopyrazinimidates (IX) which, upon treatment with an amine of the structure $HNX_2$, give the desired N'-disubstituted 3,5-diamino-6-halopyrazinamidine (I). The reaction of the pyrazinimidate (IX) with the amine preferably is carried out in the presence of a solvent such as a lower alkanol and with excess of the amine reactant. While the reaction takes place quite readily at room temperature, slight warming up to about 60° C. or to the reflux temperature of the reaction mixture if it is under 60° C., can be employed and the end product generally is obtained within 5–24 hours.

While the following examples illustrate the novel process of this invention, it is to be understood that the examples are not to be considered as limiting the invention to the particular products prepared or to the particular embodiment of the invention falling within the scope of the reaction conditions and products described hereinabove.

EXAMPLE 1

(3,5-diamino-6-chloropyrazinoyl)guanidine

Step A: Preparation of 3,5-diamino-6-chloropyrazinamide.—Methyl 3,5-diamino-6-chloropyrazinoate (0.1 mole) is added to liquid ammonia (200 ml.) in a stainless steel autoclave and the reaction mixture is heated at 100° C. for 12 hours. The ammonia is expelled and the product is removed from the autoclave and recrystallized from methanol to give a 90% yield of 3,5-diamino-6-chloropyrazinamide, melting point 218.5–220.5° C.

Step B: Preparation of 3,5-diamino-6-chloropyrazinonitrile.—To a stirred suspension of 3,5-diamino-6-chloropyrazinamide (0.0115 mole) in dimethylformamide (20 ml.) is added phosphoryl chloride (2.0 ml. excess) in one portion. The reaction temperature rises to 80° C. and is maintained at this temperature for 10 minutes by application of external heat. The solvent then is removed in vacuo and the residue is added to boiling water (50 ml.). In a few minutes a yellow crystalline solid separates, the solution is cooled and the product recovered by filtration to give a 77% yield of 3,5-diamino-6-chloropyrazinonitrile which after recrystallization from water melts at 295° C.

Step C: Preparation of ethyl 3,5-diamino-6-chloropyrazinimidate hydrochloride.—Hydrogen chloride gas (1.1 mole) is passed into a solution of 1 mole of 3,5-diamino-6-chloropyrazinonitrile in 1.1 mole of absolute ethanol and 500 ml. of absolute ether at 0° C. The solution, protected from water, is stored at 0° C. for four days. The ethyl 3,5-diamino-6-chloropyrazinimidate hydrochloride that crystallizes is collected and freed from excess hydrogen chloride in a vacuum desiccator over calcium oxide and potassium carbonate.

Step D: Preparation of N'-dimethyl 3,5-diamino-6-chloropyrazinamidine.—One mole of ethyl 3,5-diamino-6-chloropyrazinimidate hydrochloride is suspended in 1 liter of ethanol with stirring and treated with 2 moles of dimethylamine. The mixture is heated to 40° C. with continued stirring for 16 hours to give N'-dimethyl 3,5-diamino-6-chloropyrazinamidine.

Step E: Preparation of (3,5-diamino-6-chloropyrazinoyl)guanidine.—The product obtained in Step D is combined with ethanol and treated with 1 mole of guanidine. The reaction mixture then is refluxed for one hour and the solvent thereafter removed by vacuum distillation. The residue is diluted and refluxed with 500 ml. of 2N hydrochloric acid for 5 hours. Upon cooling, the product that precipitates is collected, washed with cold water and dried to give (3,5-diamino-6-chloropyrazinoyl)guanidine hydrochloride, M.P. 293.5° C. (dec.).

EXAMPLE 2

(3,5-diamino-6-bromopyrazinoyl)guanidine

By replacing the methyl 3,5-diamino-6-chloropyrazinoate employed in Example 1, Step A, by an equimolecular quantity of methyl 3,5-diamino-6-bromopyrazinoate and following substantially the same procedure described in Example 1, Steps A through E, there is obtained (3,5-diamino - 6 - bromopyrazinoyl)guanidine hydrochloride which in the form of its free base melts at 232.5–235.5° C.

Other (3 - amino - 5 - $NR^1R^2$ - 6 - chloropyrazinoyl) guanidine compounds prepared by the process of this invention are described in the following table. The products are prepared following substantially the same process described in Example 1 except the methyl 3,5-diamino-6-chloropyrazinoate employed in Step A is replaced by the appropriate ester (V) having the variable R, $R^1$ and $R^2$ defined in the following table. It is to be understood, of course, that where the definitions of the substituents represented by R, $R^1$ and $R^2$ indicate that the same ester as employed in Example 1, Step A, is required, then no change is made in this reactant. Similarly, the guanidine reactant (II) having the substituents identified for the variables $R^3$, $R^4$ and $R^5$ identified in the following table is used in place of the guanidine reactant employed in Example 1, Step E. All other reagents and reaction conditions for the preparation of the product are as described in Example 1 although the modifications hereinbefore described can be made in the various steps to ultimately give the desired (3,5-diamino-6-chloropyrazinoyl)guanidine having the structure IV as defined in the following table.

TABLE I

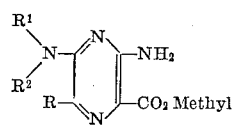 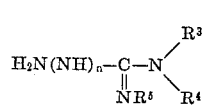 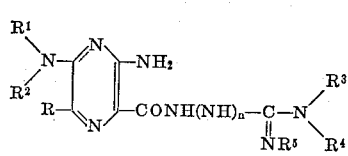

(n is zero)     (n is zero)

V     II     IV

| R | $R^1$ | $R^2$ | $R^3$ | $R^4$ | $R^5$ | M.P., °C.(d) of End Prod.[1] |
|---|---|---|---|---|---|---|
| Cl | H | H | $CH_3$ | H | H | 252–254 |
| Cl | H | H | $CH_3$ | $CH_3$ | H | [2] 277 |
| Cl | H | H | $C_2H_5$ | $C_2H_5$ | H | 265 |
| Cl | H | H | $CH_3$ | $-CH_2-C_6H_5$ | H | HCl 274.5 |
| Cl | H | H | $-CH_2CH_2OH$ | H | H | HCl 228.5–229.5 |
| Cl | H | H | $-CH_2-C_6H_5$ | H | H | 215–216 |
| Cl | H | H | $-CH_2-C_6H_4-Cl$ | H | H | 220–223 |
| Cl | H | H | $-CH_2-C_6H_4-F$ | H | H | 216–219.5 |
| Cl | H | H | $-CH_2-C_6H_4-CH_3$ | H | H | 210–212 |
| Cl | H | H | $-CH_2-C_6H_4-OCH_3$ | H | H | 175.5–179.5 |
| Cl | H | H | $-CH_2-C_6H_3(CH_3)_2$ | H | H | 220–222 |
| Cl | H | H | $-CH(CH_3)-C_6H_5$ | H | H | 152–160 |
| Cl | H | H | $-CH_2CH_2-C_6H_5$ | H | H | 219–221.5 |
| Cl | H | H | $-CH_2$-pyridyl | H | H | [3] 280.5–283.5 |
| Cl | H | H | -------- $-CH_2CH_2-$ -------- | | H | 222.5–223. |
| Cl | H | -iPr | $CH_3$ | H | H | >300 |
| Cl | H | -iPr | $CH_3$ | $CH_3$ | H | 238.5–240 |
| Cl | H | -iPr | $-CH_2CH_2OH$ | H | H | [4] 185–186 |
| Cl | H | -iPr | $CH_2-C_6H_5$ | H | H | 200.5–204.5 |
| Cl | H | $-CH_2CH=CH_2$ | H | H | H | 213–214 |
| Cl | H | $-CH_2CH=CH_2$ | $CH_3$ | $CH_3$ | H | 213–215 |
| Cl | H | nBu | $CH_3$ | $CH_3$ | H | 187.5 |
| Cl | H | $-CH_2$-cyclopropyl | H | H | H | 220–221.5 |
| Cl | $CH_3$ | $CH_3$ | H | H | H | 216–217 |
| Cl | $CH_3$ | $C_2H_5$ | H | H | H | 229–230 |
| Cl | $CH_3$ | nPr | H | H | H | 214–215 |
| Cl | $CH_3$ | -iPr | H | H | H | 207–208 |
| Cl | $CH_3$ | -iPr | $CH_3$ | $CH_3$ | H | 209–211 |
| Cl | Et | Et | $CH_3$ | $CH_3$ | H | 212–214 |

[1] As free base unless otherwise noted. [2] HCl monohydrate. [3] 2 HCl. [4] HCl·hemihydrate.

EXAMPLE 3

*(3,5-diamino-6-chloropyrazinamido)guanidine*

By replacing the guanidine employed in Example 1, Step E, by an equimolecular quantity of aminoguanidine and then following substantially the same procedure described in Step E of Example 1 there is obtained (3,5-diamino-6-chloropyrazinamido)guanidine, which in the form of its free base melts at 281–282° C. (dec.).

EXAMPLE 4

*(3-amino-5-dimethylamino-6-chloropyrazinamido)guanidine*

By replacing the methyl 3,5-diamino-6-chloropyrazinoate employed in Example 1, Step A, by an equimolecular quantity of methyl 3-amino-5-dimethylamino-6-chloropyrazinoate and by replacing the guanidine employed in Example 1, Step E, by an equimolecular quantity of aminoguanidine and then following substantially the same procedures described in Example 1, Steps A through E, there is obtained (3-amino-5-dimethylamino-6-chloropyrazinamido)guanidine which in the form of its free base melts at 221° C. (dec.).

EXAMPLE 5

*1-(3,5-diamino-6-chloropyrazinamido)-3,3-dimethylguanidine hydrochloride*

The above product is prepared following substantially the same procedure described in Example 3 except the aminoguanidine reactant called for in Example 3 is replaced by an equimolecular quantity of 1-amino-3,3-dimethylguanidine. The product obtained in the form of its hydrochloride salt melts at 279–280° C. (dec.).

By replacing the methyl 3,5-diamino-6-chloropyrazinoate employed in Step A of Example 1 by the methyl 3-amino-5-$NR^1R^2$-6-chloropyrazinoate (V) identified in Table I and by replacing the guanidine (II) employed in Step E by an equimolecular quantity of aminoguanidine and then following substantially the same procedures described in Example 1, Steps A through E, there are produced the corresponding (3-amino-5-$NR^1R^2$-6-chloropyrazinamido)guanidines having the $R^1$ and $R^2$ substituents identified in Table I.

Similarly, by replacing the guanidine reactant employed in Example 2 by an equimolecular quantity of aminoguanidine and then following substantially the same procedure described in Example 2 there is obtained (3,5-diamino-6-bromopyrazinamido)guanidine.

In like manner, by replacing the aminoguanidine employed in Example 3 by an equimolecular quantity of:

1-amino-3-methylguanidine,
1-amino-3-(2-hydroxyethyl)guanidine,
1-amino-3-phenethylguanidine,
1-amino-3-benzylguanidine,
1-amino-2,3-ethyleneguanidine, and
1-amino-3,3-dimethylguanidine, and then following substantially the same procedure described in Example 3 there is obtained, respectively, 1-(3,5-diamino-6-chloropyrazinamido)-3-methylguanidine,
1-(3,5-diamino-6-chloropyrazinamido)-3-(2-hydroxyethyl)guanidine,
1-(3,5-diamino-6-chloropyrazinamido)-3-phenethylguanidine,
1-(3,5-diamino-6-chloropyrazinamido)-3-benzylguanidine,
1-(3,5-diamino-6-chloropyrazinamido)-2,3-ethyleneguanidine, and
1-(3,5-diamino-6-chloropyrazinamido)-3,3-dimethylguanidine.

What is claimed is:

1. A process wherein an N-disubstituted 3,5-diamino-6-halopyrazinamidine (I) is reacted with a product selected from guanidine and aminoguanidine (II) and the product thus obtained then treated with a mineral acid to form the corresponding (3,5-diamino-6-halopyrazinoyl)guanidine and (3,5-diamino-6-halopyrazinamido)guanidine respectively.

2. A process as claimed in claim 1 wherein the first step of the reaction is carried out in the presence of a lower alkanol solvent.

3. A modification of the process claimed in claim 1 wherein the N-disubstituted 3,5-diamino-6-halopyrazinamidine is reacted with a product selected from guanidine and aminoguanidine to give N-disubstituted-N'-amidino (or guanidino) 3,5-diamino-6-halopyrazinamidine.

4. A process as claimed in claim 3 wherein the N-disubstituted-N'-amidino (or guanidino) 3,5-diamino-6-halopyrazinamidine is treated with a mineral acid to give a (3,5-diamino-6-halopyrazinamido)guanidine.

5. A process as claimed in claim 1 wherein reactant I and reactant II have the following structures

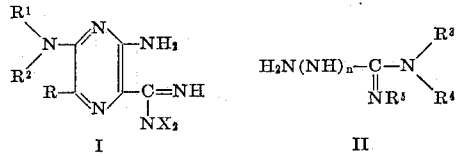

wherein R is selected from the group consisting of chlorine and bromine, $R^1$ is selected from the group consisting of hydrogen, lower alkyl, lower alkenyl and lower-(cycloalkyl-alkyl); $R^2$ is selected from the group consisting of hydrogen, lower alkyl, lower alkenyl, and lower-(cycloalkyl-alkyl); $R^3$ is selected from the group consisting of hydrogen, lower alkyl, hydroxy-lower alkyl, phenyl-lower alkyl, (halophenyl)-lower alkyl, (lower alkyl-phenyl)-lower alkyl, (lower alkoxy-phenyl)-lower alkyl, and pyridyl-lower alkyl; $R^4$ is selected from the group consisting of hydrogen, lower alkyl and phenyl-lower alkyl; $R^5$ is selected from the group consisting of hydrogen and lower alkyl; and when $R^4$ and $R^5$ each are lower alkyl, they can be linked together to form a cyclic structure with the nitrogen atoms to which they are attached; and $n$ is a numeral selected from 0 and 1, and X is selected from the group consisting of lower alkyl and phenyl lower alkyl.

6. A process as claimed in claim 1 wherein an N-di-lower alkyl 3-,5-diamino-6-chloropyrazinamidine and guanidine are reacted and the product thus formed then treated with a mineral acid to give (3,5-diamino-6-chloropyrazinoyl)guanidine.

7. A process as claimed in claim 1 wherein N-di-lower alkyl 3-amino-5-dimethylamino-6-chloropyrazinamidine and guanidine are reacted and the product thus formed then treated with a mineral acid to give (3-amino-5-dimethylamino-6-chloropyrazinoyl)guanidine.

8. A process as claimed in claim 1 wherein N-di-lower alkyl 3,5-diamino-6-chloropyrazinamidine and aminoguanidine are reacted and the product thus formed then treated with a mineral acid to give (3,5-diamino-6-chloropyrazinamido)guanidine.

9. A product of the structure

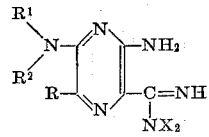

wherein R, $R^1$, $R^2$ and X have the meaning assigned to each of them in claim 5.

10. N - di-loweralkyl 3,5-diamino-6-chloropyrazinamidine.

11. N-d-loweralkyl N'-amidino 3,5-diamino-6-chloropyrazinamidine.

12. N-di-loweralkyl N'-guanidino 3,5-diamino-6-chloropyrazinamidine.

No references cited.

NICHOLAS S. RIZZO, *Primary Examiner.*